US006917786B1

(12) United States Patent
Mizuguchi (10) Patent No.: US 6,917,786 B1
(45) Date of Patent: Jul. 12, 2005

(54) WIRELESS RECEIVER AND METHOD OF CALIBRATION THEREOF

(75) Inventor: Hironori Mizuguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 595 days.

(21) Appl. No.: 10/130,741

(22) PCT Filed: Nov. 24, 2000

(86) PCT No.: PCT/JP00/08285

§ 371 (c)(1),
(2), (4) Date: May 23, 2002

(87) PCT Pub. No.: WO01/39394

PCT Pub. Date: May 31, 2001

(30) Foreign Application Priority Data

Nov. 24, 1999 (JP) .......................................... 11-333007

(51) Int. Cl.[7] .............................................. H04B 17/00
(52) U.S. Cl. .................. 455/67.14; 455/561; 455/562.1
(58) Field of Search .............................. 455/67.14, 272, 455/273, 276.1, 423, 424, 425, 561, 562.1

(56) References Cited

U.S. PATENT DOCUMENTS

| 5,029,181 A | | 7/1991 | Endo et al. ................ 375/147 |
|---|---|---|---|
| 5,349,360 A | | 9/1994 | Matsui ....................... 342/374 |
| 5,786,791 A | * | 7/1998 | Bruckert ..................... 342/457 |
| 6,377,613 B1 | * | 4/2002 | Kawabe et al. ............. 375/142 |

FOREIGN PATENT DOCUMENTS

| EP | 0 825 734 A2 | 2/1998 |
|---|---|---|
| EP | 0 938 204 A1 | 8/1999 |
| JP | 5-259736 | 10/1993 |
| JP | 11-046180 | 2/1999 |
| JP | 11-068443 | 3/1999 |
| JP | 2000-295152 | 10/2000 |

* cited by examiner

*Primary Examiner*—Harry S. Hong
*Assistant Examiner*—Quynh H. Nguyen
(74) *Attorney, Agent, or Firm*—Foley & Lardner LLP (57) ABSTRACT

A radio receiving apparatus according to the present invention includes an array antenna having a plurality of antennas and an array receiving unit, and obtains a correction amount by using a known calibration signal. The radio receiving apparatus further includes a diversity receiving unit that receives the reception outputs of the plurality of antennas as inputs, carries out diversity processing, and outputs the results, a diversity reception quality monitoring unit for monitoring the reception quality of diversity reception, and an array reception quality monitoring unit for monitoring the reception quality of array antenna reception. If the reception quality of the diversity reception is equivalent to the reception quality of the array antenna reception, then the calibration of the array receiving unit is carried out while implementing the diversity reception so as to obtain the correction amounts of the amplitude fluctuation and the phase shift of the array receiving unit.

14 Claims, 3 Drawing Sheets

WIRELESS RECEIVER AND METHOD OF CALIBRATION THEREOF

TECHNICAL FIELD

The present invention relates to a radio receiving apparatus having an array antenna used for CDMA system radio communication and, more particularly, to a radio receiving apparatus that carries out calibration of a radio receiving unit, and a calibration method for the same.

BACKGROUND ART

In a mobile communication using the CDMA system, a plurality of mobile stations shares the same frequency band, and each mobile station spreads transmission data by a spread code and transmits the data toward a base station. The individual mobile stations are assigned different spread codes having orthogonality with respect to each other, The base station is able to extract reception data from a received signal transmitted from a particular mobile station by performing inverse spread using the same spread code used for spread by the mobile station.

However, as the number of multiplex stations of mobile stations increases, the communication quality is deteriorated by the interference between different stations based on mutual correlation characteristics of the spread code. As the number of multiplex stations of the mobile stations further increases, connection of a call becomes difficult. On the contrary, it can be said that restraining the interference between the different stations permits improved efficiency of frequency utilization, improved communication quality, and an increased line capacity to be achieved. Hence, in the mobile communication using CDMA system, the restraint of the interference between the different stations is an important problem.

As a method for restraining the interference between the different stations in a direct spread CDMA system mobile communication, a method using an adaptive array antenna has been extensively studied, and many reports have been made.

The adaptive array antenna uses an array antenna constructed by a plurality of antennas. In such an adaptive array antenna, the directivity can be imparted to the entire array antenna by weighting the amplitude and phase of the reception output of each antenna and by synthesizing the weighted outputs. Furthermore, by changing the weighting, the directivity of the array antenna can be changed. The interference between the different stations can be effectively restrained by applying the reception using the adaptive array antenna (hereinafter referred to as "the array antenna reception") to the mobile communication and by implementing a good directivity pattern by changing the weighting on the basis of a predetermined algorithm.

Generally, however, radio receiving units have different amplitude fluctuations and phase shifts due to variations in the elements making up amplifiers. In addition, the amplitude fluctuations and phase shifts change with time. Since the variations in these amplitude fluctuation and phase shift lead to a difference between a directivity pattern expected to be obtained by the control based on an algorithm and an actually obtained directivity pattern, the variations are barriers in implementing effective restraint of the interference between the different stations.

In order to correct the aforementioned variations, an operation called "calibration" has been performed, in which a known signal is received by each radio receiving unit, the amplitude fluctuations and phase shift of each are measured, and the measurement results are fed back in weighting and synthesizing.

The following will briefly explain a few conventional calibration methods.

(First Conventional Example)

As it will be explained in detail hereinafter, according to a first conventional calibration method, the spread code that is different from the spread code allocated to a mobile station for telephone calls is used to spread a known calibration signal, and the calibration signal is superimposed on a reception output of the antenna.

(Second Conventional Example)

As it will be explained in detail hereinafter, according to a second conventional calibration method, a reception output of an antenna is cut off, and only a calibration signal is received.

(Third Conventional Example)

According to a third conventional calibration method, a known signal is multiplexed in a time-division manner into a signal transmitted by a mobile station. A radio receiving apparatus in the third conventional calibration method separates the calibration signal that has been multiplexed in the time-division manner from a received signal and uses it for calculating a correction amount.

The radio receiving apparatuses in the conventional examples described above pose the following problems.

In the first conventional example, the calibration signal becomes a noise relative to a call signal transmitted by a mobile station, resulting in deteriorated speech quality. On the other hand, a call signal becomes a noise relative to the calibration signal, resulting in deteriorated accuracy of calibration.

In the second conventional example, a call of a mobile station is cut off, so that the call service is interrupted during calibration.

In the third conventional example, the communication capacity that a mobile station can use for calls is decreased by the calibration signal multiplexed in the time-division manner.

Accordingly, an object of the present invention is to provide a radio receiving apparatus that uses an adaptive array antenna and performs calibration without deteriorating speech quality.

Another object of the present invention is to provide a calibration method for the foregoing radio apparatus.

DISCLOSURE OF INVENTION

A radio receiving apparatus according to the present invention includes an array antenna constituted by a plurality of antennas, a plurality of array radio receiving units provided in correspondence to the individual antennas, an array signal processing unit for weighting the outputs of the individual array radio receiving units in accordance with a predetermined algorithm, synthesizing the weighted outputs, and then outputting the synthesized output, and a detecting unit for calculating correction amounts of an amplitude fluctuation and a phase shift of each array radio receiving unit on the basis of the output of each array radio receiving unit. The radio receiving apparatus obtains the correction amount by using a calibration signal that is a known signal.

According to an aspect of the present invention, calibration signal switching units are connected between the individual antennas and the array radio receiving units associated with the individual antennas. The calibration signal switching units receive a reception output of the individual antennas and the calibration signal and select one of them, then output the selected one to the array radio receiving unit. A diversity receiving unit receives the reception outputs of the plurality of antennas and carries out diversity processing on them, then outputs the results. A demodulation signal switching unit receives an output of the array signal processing unit and an output of the diversity receiving unit, and outputs either one of them. A diversity reception quality monitoring unit monitors the reception quality of the diversity reception performed by the diversity receiving unit. An array reception quality monitoring unit monitors the reception quality of array antenna reception effected by the array radio receiving units and the array signal processing unit. A receiving system deciding unit instructs the demodulation signal switching unit to select the output of the diversity receiving unit, and instructs the calibration signal switching unit to select the calibration signal when the reception quality of the diversity reception is equal to the reception quality of the array antenna reception.

In addition, after completion of the calculation of the correction amounts of the amplitude fluctuation and the phase shift of each array radio receiving unit, the receiving system deciding unit may alternatively instruct the demodulation signal switching unit to select the output of the array signal processing unit and instruct the calibration signal switching unit to select the reception output of the antenna.

When the receiving system deciding unit is instructed from outside to calculate the correction amounts of amplitude fluctuation and phase shift, the receiving system deciding unit may instruct the demodulation signal switching unit to select an output of the diversity receiving unit and instruct the calibration signal switching unit to select the calibration signal if the reception quality of the diversity reception is equivalent to the reception quality of the array antenna reception.

Thus, the radio receiving apparatus according to the present invention carries out the diversity reception in place of the array antenna reception and separates the array radio receiving unit from the antenna to perform calibration when the reception quality equivalent to the array antenna reception can be secured by the diversity reception. As a result, highly accurate calibration can be automatically effected without causing interrupted communication, a decreased capacity, and degraded communication quality.

Furthermore, the calibration signal switching unit is able to output either the reception output of the individual antennas or the calibration signal, or a synthesized signal derived therefrom. When the receiving system deciding unit is instructed from outside to calculate the correction amounts of the amplitude fluctuation and the phase shift, the receiving system deciding unit may instruct the demodulation signal switching unit to select the output of the array signal processing unit and instruct the calibration signal switching unit to output the synthesized signal derived from the reception output of the antenna and the calibration signal if the reception quality of the array antenna reception is better than the reception quality of the diversity reception. In this case, highly accurate calibration is possible without causing degraded communication quality and interrupted communication when the diversity reception quality is equivalent to the array reception quality. On the other hand, if the diversity reception quality is inferior to the array reception quality, the calibration can be effected without the need for interrupting communication by superimposing the calibration signal.

Alternatively, when the receiving system deciding unit is instructed from outside to calculate the correction amounts of the amplitude fluctuation and the phase shift, the receiving system deciding unit may instruct the demodulation signal switching unit to select the output of the array signal processing unit if the reception quality of the array antenna reception is better than the reception quality of the diversity reception. In this case, the receiving system deciding unit instructs a predetermined calibration signal switching unit selected from among the plurality of calibration signal switching units to select the calibration signal, and instructs the remaining calibration signal switching units to select reception outputs of the antennas. The receiving system deciding unit also sequentially changes over the calibration signal switching unit that selects the calibration signal. In this case, if the reception quality of the diversity reception is equivalent to the reception quality of the array antenna reception, then highly accurate calibration is possible without causing degraded communication quality and interrupted communication. On the other hand, if the reception quality of the diversity reception is inferior to the reception quality of the array antenna reception, then calibration can be effected without interrupting communication by sequentially changing over the array radio receiving units.

A calibration method according to the present invention is applied to a radio receiving apparatus having an array antenna constituted by a plurality of antennas and a plurality of array radio receiving units provided in correspondence to the individual antennas. In the calibration method, a reception result obtained by the array antenna reception in which the outputs of the individual array radio receiving units are weighted and synthesized in accordance with a predetermined algorithm is captured as a demodulation signal to obtain the correction amounts of the amplitude fluctuations and phase shifts of the individual array radio receiving units by using a calibration signal, which is a known signal.

In the calibration method, the reception outputs of the individual antennas are received by associated array radio receiving units, the outputs of the individual array radio receiving units are weighted and synthesized in accordance with the predetermined algorithm, and the reception quality of the array antenna reception is monitored on the basis of the synthesized signal. On the other hand, the processing for the diversity reception is carried out by using the outputs of the plurality of antennas, and the reception quality of the diversity reception is monitored. If the reception quality of the diversity reception is equivalent to the reception quality of the array antenna reception, a changeover is effected so that a result of the diversity reception is captured as the demodulation signal in place of a result of the array antenna reception, and the calibration signal is input to the individual array radio receiving units, and the correction amounts of the amplitude fluctuations and phase shifts of the individual array radio receiving units are obtained on the basis of the outputs of the individual radio receiving units.

In additon, when the calculation of the correction amounts of the amplitude fluctuation and phase shift is instructed from outside, if the reception quality of diversity reception is equivalent to the reception quality of the array antenna reception, then an arrangement may be made so as to effect a changeover to capture a result of the diversity reception in place of a result of the array antenna reception as the demodulation signal, supply the calibration signal to each array radio receiving unit, and obtain the correction amount of the amplitude fluctuation and the phase shift of each array radio receiving unit on the basis of the output of each array radio receiving unit.

Furthermore, when the calculation of the correction amounts of the amplitude fluctuation and phase shift is instructed from outside, if the reception quality of the array antenna reception is better than the reception quality of the diversity reception, then the synthesized signal derived from the reception output of each antenna and the calibration signal may be supplied to the array radio receiving unit associated with each antenna so as to obtain the correction amounts of the amplitude fluctuation and the phase shift of each array radio receiving unit on the basis of the outputs of the array radio receiving units.

Alternatively, when the calculation of the correction amounts of the amplitude fluctuation and phase shift is instructed from outside, if the reception quality of the array antenna reception is better than the reception quality of the diversity reception, then the calibration signal may be supplied only to a predetermined array radio receiving unit selected from among the plurality of array radio receiving units, while supplying the reception outputs of the antennas to the remaining array radio receiving units. In this case, the array radio receiving unit to which the calibration signal is supplied is changed in order to obtain the correction amounts of the amplitude fluctuation and the phase shift of each array radio receiving unit on the basis of the output of each array radio receiving unit.

BEST MODE FOR CARRYING OUT THE INVENTION

For easier understanding of the present invention, the first and second conventional examples described above will be explained with reference to the accompanying drawings.

Figure 1:
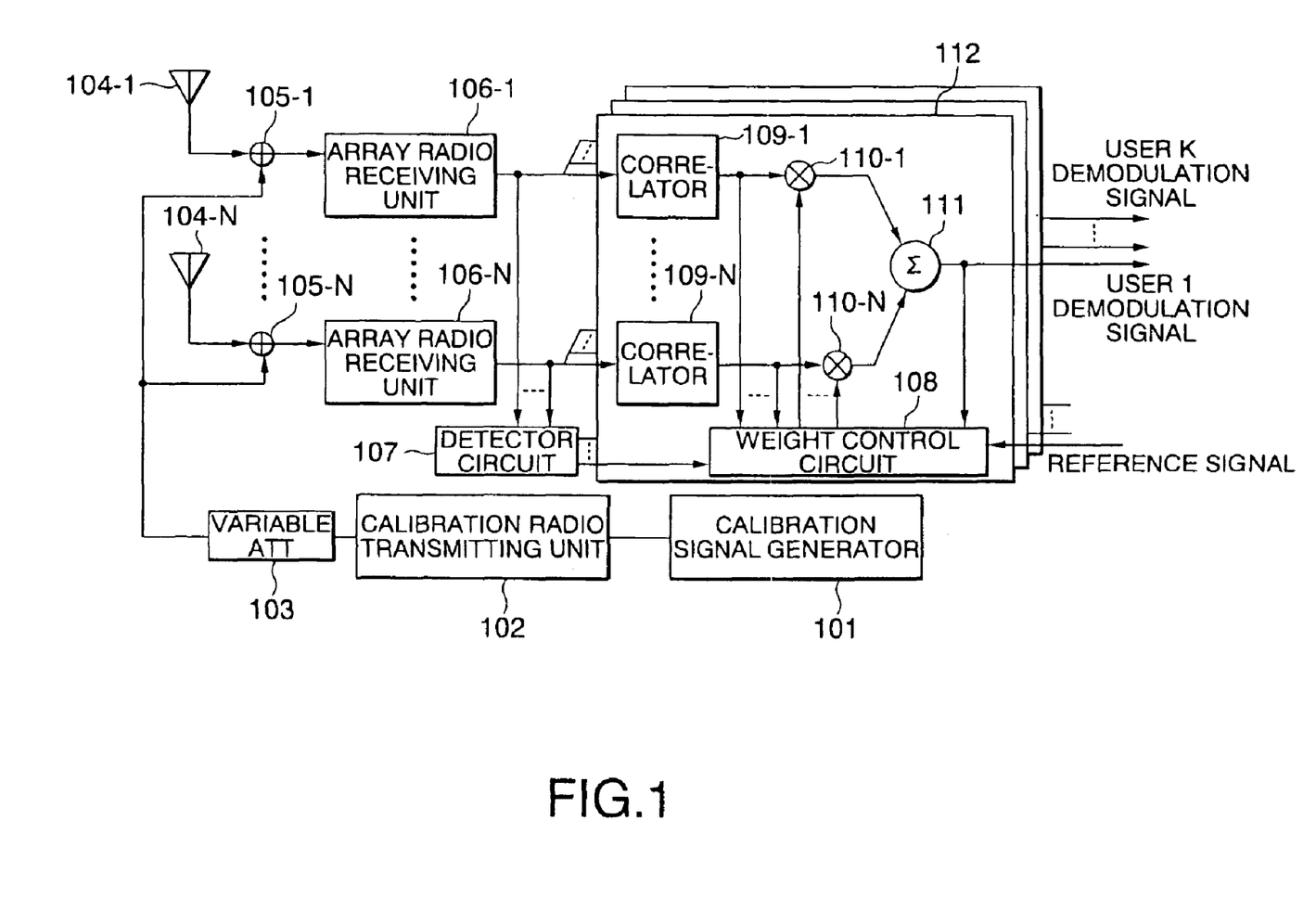
FIG. 1 is a block diagram showing the configuration of a conventional radio receiving apparatus using a calibration method wherein a calibration signal is spread using a spread code that is different from a call signal and superimposed on the call signal.

FIG. 1 is a block diagram showing the configuration of the radio receiving apparatus of the first conventional example. The radio receiving apparatus uses a calibration method wherein a calibration signal is spread by the spread code that is different from a call signal and superimposed on the call signal.

In FIG. 1, the radio receiving apparatus includes a calibration signal generator 101 for generating a known calibration signal. A calibration signal radio transmitting unit 102 transmits the calibration signal. A variable attenuator 103 attenuates an output of the calibration signal radio transmitting unit 102 by an attenuation amount that can be set. The radio receiving apparatus further includes antennas 104-1 through 104-N (N is a positive integer) for receiving radio signals. Adders 105-1 through 105-N add an output of the variable attenuator 103 to the reception outputs of the antennas 104-1 through 104-N. Array radio receiving units 106-1 through 106-N receive the outputs of the adders 105-1 through 105-N and carries out reception processing.

The radio receiving apparatus further includes at least one array signal processing unit 112 that receives the outputs of the array radio receiving units 106-1 through 106-N and carries out inverse spreading, weighting, and synthesizing. The array signal processing unit 112 has a weight control circuit 208, correlators 109-1 through 109-N, multipliers 110-1 through 110-N, and a synthesizer 111.

A detector circuit 107 receives the outputs of the array radio receiving units 106-1 through 106-N, and calculates the correction amounts of the amplitude fluctuation and the phase shift of each of the array radio receiving units 1061 through 106-N. The detector circuit 107 supplies the calculated correction amounts to the array signal processing unit 112.

The operation of the radio receiving apparatus in a calibration mode will be described. Calibration signals are superimposed on the reception outputs of the antennas 104-1 through 104-N by the adders 105-1 through 105-N. The calibration signals that have passed through the array radio receiving units 106-1 through 106-N are compared in the detector circuit 107. The detector circuit 107 calculates the correction amounts of the amplitude fluctuations and the phase shifts for the array radio receiving units 106-1 through 106-N on the basis of the comparison results, and supplies the calculated correction amounts to the array signal processing unit 112. The array signal processing unit 112 corrects the weighting in the multipliers 110-1 through 110-N on the basis of the supplied correction amounts.

In this radio receiving apparatus, the calibration signals are noises for the call signals transmitted by a mobile station, causing degraded speech quality. Speech signals are noises for the calibration signals, causing degraded calibration accuracy.

Figure 2:
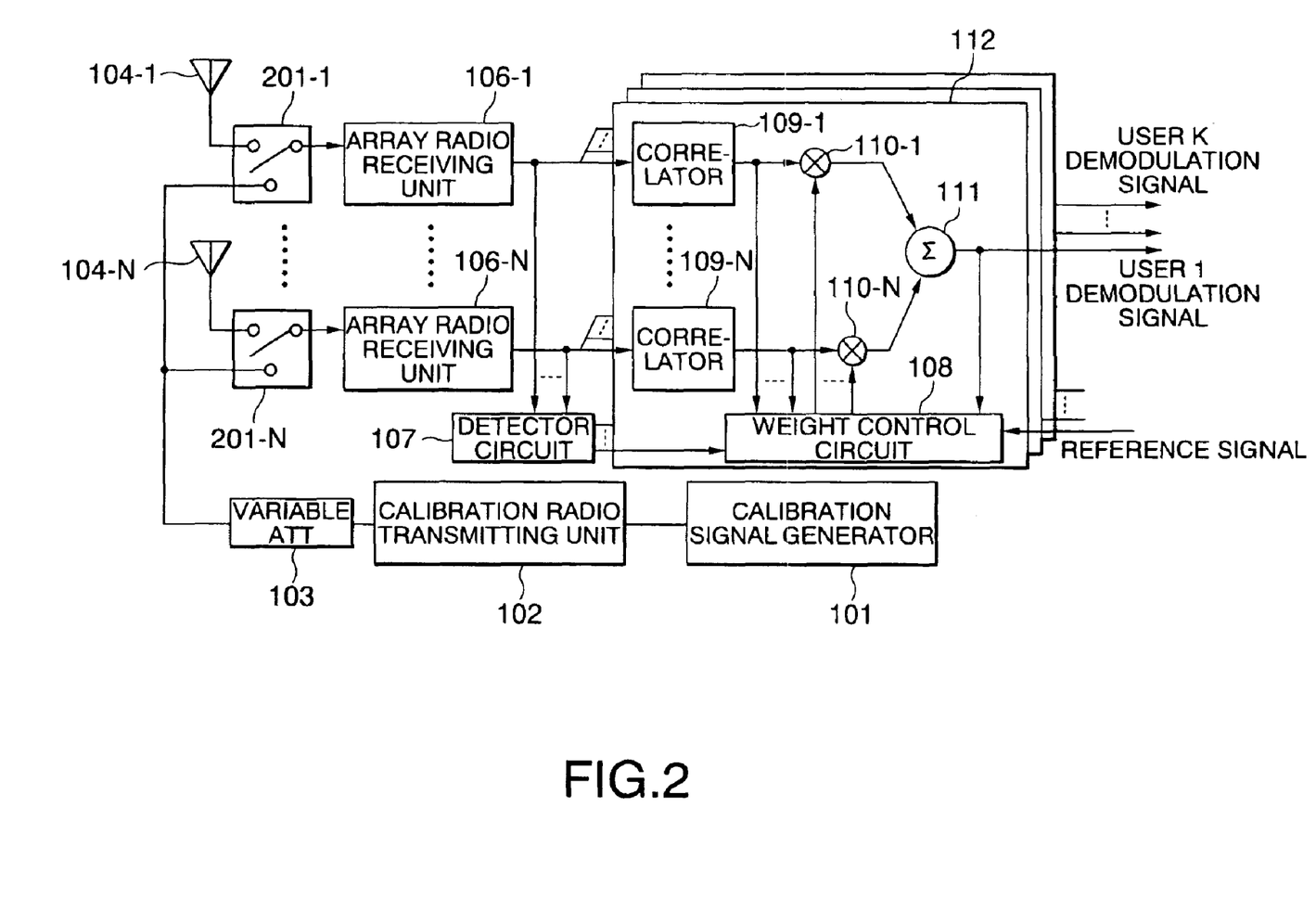
FIG. 2 is a block diagram showing the configuration of another conventional radio receiving apparatus using a calibration method wherein a reception output of an antenna is cut off to receive only a calibration signal.

FIG. 2 is a block diagram showing the configuration of the radio receiving apparatus of the second conventional example. The radio receiving apparatus uses a calibration method wherein the reception outputs of antennas are cut off to receive only calibration signals.

In FIG. 2, the radio receiving apparatus differs from the first conventional example in the following aspect. The radio receiving apparatus has switching units 201-1 through 201-N, which switch the reception outputs of the antennas and the outputs of the variable attenuator 103 and supply the outputs to the array radio receiving units 106-1 through 106-N, in place of the adders 105-1 through 105-N shown in FIG. 1.

The radio receiving apparatus cuts off the reception outputs of the antennas 104-1 through 104-N by the switching units 201-1 through 201-N, and inputs only the calibration signals to the array radio receiving units 106-1 through 106-N. In this state, the correction amounts of the amplitude fluctuations and the phase shifts are calculated by the detector circuit 107, as in the case of the first conventional example. In the array signal processing unit 112, the weighting in the multipliers 110-1 through 110-N is corrected on the basis of the calculated correction amounts.

In this radio receiving apparatus, the calls of a mobile station are cut off, so that the communication service thereof is interrupted during the calibration.

Next, referring now to FIG. 3, a radio receiving apparatus according to a preferred embodiment of the present invention will be explained.

Figure 3:
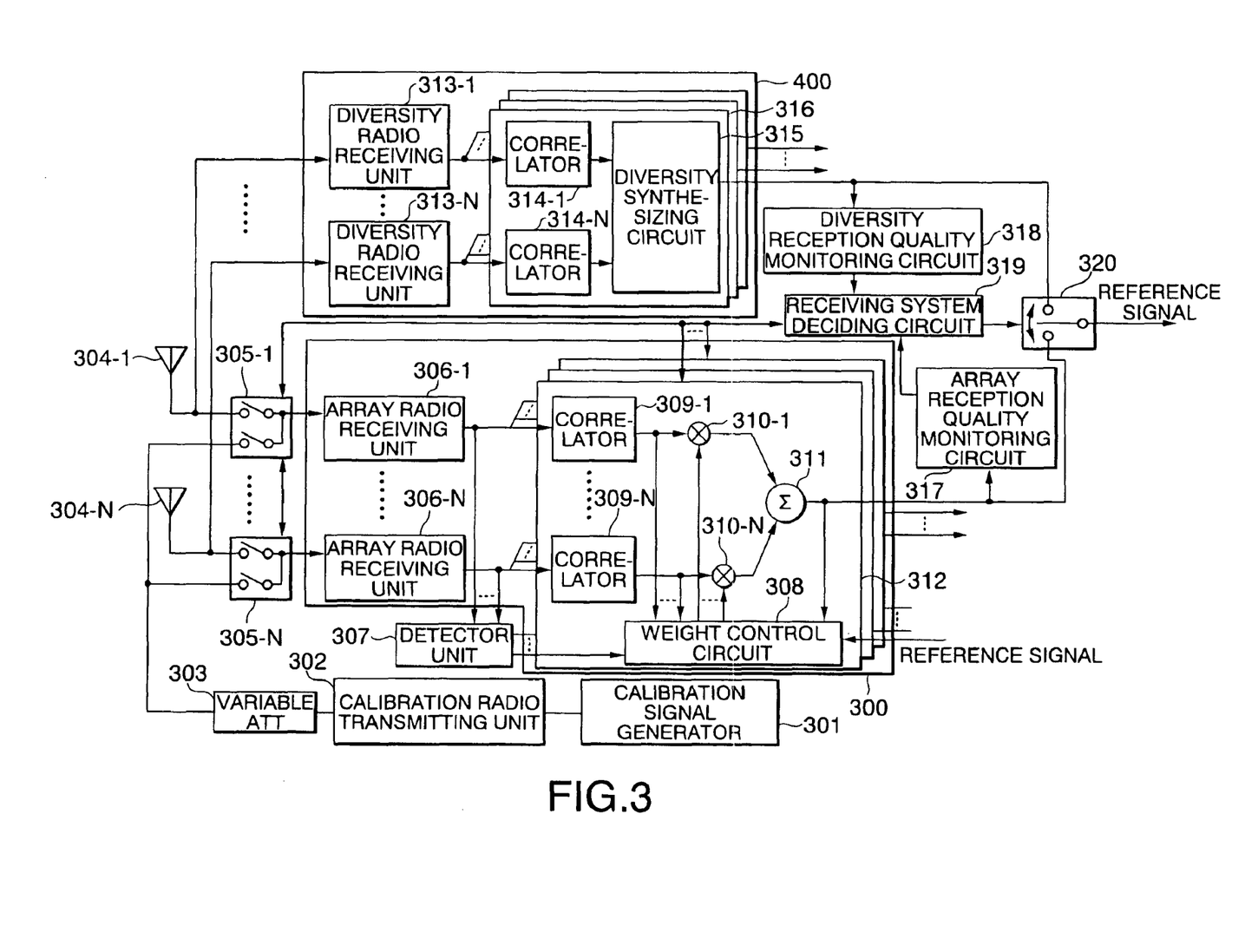
FIG. 3 is a block diagram showing a configuration example wherein a radio receiving apparatus according to the present invention has been applied to a base station in a CDMA mobile communication.

FIG. 3 is a block diagram showing a configuration example wherein the radio receiving apparatus according to the present invention has been applied to a base station in the CDMA mobile communication.

In FIG. 3, the radio receiving apparatus includes a calibration signal generator 301 for generating a known signal (e.g., all zeros) that provides a calibration reference. A calibration signal radio transmitting unit 302 spreads a signal output by the calibration signal generator 301 by using predetermined spread code, and transmits the signal output. A variable attenuator 303 attenuates an output of the calibration signal radio transmitting unit 302 by an attenuation amount that can be set. The radio receiving apparatus further includes antennas 304-1 through 304-N for receiving radio signals. Calibration signal selectors 305-1 through 305-N output either a reception output of the antennas 304-1 through 304-N or an output of the variable attenuator 303, or a synthesized signal derived therefrom. An array receiving unit 300 receives the outputs of the calibration signal selectors 305-1 through 305-N, weights and synthesizes the individual outputs, then output the results.

The radio receiving apparatus further includes an array reception quality monitoring circuit 317, a diversity receiving unit 400, a diversity reception quality monitoring circuit 318, a receiving system deciding circuit 319, and a demodulation signal switching unit 320. The array reception quality monitoring circuit 317 monitors the quality of an output of the array receiving unit 300. Here, the quality refers to an SN ratio (Signal to Noise power ratio), BER (Bit Error Rate), etc. The diversity receiving unit 400 carries out diversity reception processing on the basis of the reception outputs of the antennas 304-1 through 304-N. The diversity reception quality monitoring circuit 318 monitors the quality (SN ratio, BER, etc.) of an output of the diversity receiving unit 400. The receiving system deciding circuit 319 issues instruction for selecting the diversity receiving unit 400 if the quality obtained at a diversity reception quality monitoring circuit 318 is equal to or higher than the quality obtained at an array reception quality monitoring circuit 317. A demodulation signal switching unit 320 selects an output of the array receiving unit 300 or an output of the diversity receiving unit 400 on the basis of an instruction of the receiving system deciding circuit 319. The calibration signal selectors 305-1 through 305-N also output either reception outputs of the antennas 304-1 through 304-N or the outputs (calibration signals) of the variable attenuator 303, or a synthesized signal derived therefrom on the basis of an instruction of the receiving system deciding circuit 319.

The array receiving unit 300 includes array radio receiving units 306-1 through 306-N that receive the outputs of the calibration signal switching units 305-1 through 305-N and convert them into baseband signals, then output the baseband signals. The array receiving unit 300 further includes at least one array signal processing unit 312 that receives the outputs of the array radio receiving units 306-1 through 306-N, weights and synthesizes them, and output the results. A detector circuit 307 calculates the correction amounts of the amplitude fluctuations and the phase shifts associated with the array radio receiving units 306-1 through 306-N, and notifies the array signal processing unit 312 of the calculated correction amounts. The array signal processing unit 312 has a weight control circuit 308, correlators 309-1 through 309-N, multipliers 310-1 through 310-N, and a synthesizer 311.

The correlators 309-1 through 309-N receive outputs of the array radio receiving units 306-1 through 306-N, and inversely spread them by using the predetermined spread code. The weight control circuit 308 calculates and outputs the weighting coefficients associated with the outputs of the correlators 309-1 through 309-N on the basis of a predetermined algorithm and the correction amounts instructed by the detector circuit 307. The outputs of the correlators 309-1 through 309-N and the corresponding weighting coefficients are multiplied by the multipliers 310-1 through 310-N. The outputs of the multipliers 310-1 through 310-N are synthesized by the synthesizer 311.

On the other hand, the diversity receiving unit 400 includes diversity radio receiving units 313-1 through 313-N and at least one diversity signal processing unit 316. The diversity radio receiving units 313-1 through 313-N receive the outputs of the antennas 304-1 through 304-N and convert them into baseband signals, then output the baseband signals. The diversity signal processing unit 316 carries out diversity processing on the outputs of the diversity radio receiving units 313-1 through 313-N. The diversity signal processing unit 316 has correlators 314-1 through 314-N that receive the outputs of the diversity radio receiving units 313-1 through 313-N and inversely spread them by the predetermined spread code, and a diversity synthesizing circuit 315 that carries out diversity processing on the outputs of the correlators 314-1 through 314-N.

The aforementioned diversity processing may be any one of selection, equal gain synthesization, maximum ratio synthesization, etc.

The operation of the radio receiving apparatus according to the present invention in a normal mode (non-calibration mode) will now be described.

Normally, the reception quality of the array antenna reception obtained at the array reception quality monitoring circuit 317 is better than the reception quality of the diversity reception obtained at the diversity reception quality monitoring circuit 318. Hence, the calibration signal switching units 305-1 through 305-N makes selection such that only the reception outputs of the antennas are input to the array receiving unit 300. The demodulation signal switching unit 320 selects the outputs of the array receiving unit 300, and the selected signals are used as demodulation signals in a subsequent stage (not shown).

The operation in the calibration mode will now be explained.

The radio receiving apparatus performs calibration when the reception quality of the diversity reception is equivalent to the reception quality of the array antenna reception.

The receiving system deciding circuit 319 instructs the demodulation signal switching unit 320 to select the outputs of the diversity receiving unit 400 when the reception quality of the diversity reception is equivalent to the reception quality of the array antenna reception, and instructs the calibration signal switching units 305-1 through 305-N to output only calibration signals. Thus, the outputs of the diversity receiving unit 400 are used as the demodulation signals.

Only calibration signals are supplied to the array receiving unit 300. Based on the outputs of the array radio receiving units 306-1 through 306-N, the detecting circuit 307 calculates the correction amounts of the amplitude fluctuations and phase shifts for the array radio receiving units 306-1 through 306-N, and notifies the weight control circuit 308 of the calculated correction amounts. Thereafter, the weight control circuit 308 effects synthesization based on the weighting that reflects the correction amounts.

Upon completion of the calibration, the receiving system deciding circuit 319 instructs the calibration signal switching units 305-1 through 305-N to select the reception outputs of the antennas, and instructs the demodulation signal switching unit 320 to select the outputs of the array receiving unit 300.

As described above, when the diversity reception enables the same reception quality as that obtained by the array antenna reception to be secured, the diversity reception is performed in place of the array antenna reception, and the array receiving unit 300 is separated from the antennas 304-1 through 304-N to carry out calibration. As a result, highly accurate calibration can be automatically performed without causing interrupted calls of a mobile station, a reduced communication capacity, or degraded speech quality, thus making it possible to always maintain good effect for restraining the interference of an adaptive array antenna.

In such a case as the one where an instruction for manual start of calibration is issued, the reception quality of the diversity reception may be inferior to the reception quality of the array antenna reception. At this time, the radio receiving apparatus according to the present invention may reject the calibration or forcibly carry out the calibration. Alternatively, a plurality of calibration startups carrying priorities may be defined to select either rejection or forcible startup.

When forcibly carrying out calibration, the radio receiving apparatus according to the present invention may spread a calibration signal by using a spread code that is different from the one used by a mobile station, and superimpose the spread calibration signal on a reception output of an antenna.

It is assumed that the reception quality of the diversity reception is inferior to the reception quality of the array antenna reception when an instruction for manual or the like startup of calibration is received. In this case, the calibration signal switching units 305-1 through 305-N makes a selection so as to superimpose a calibration signal on a reception output of the antenna and to supply the result to the array receiving unit 300. The demodulation signal switching unit 320 holds the state wherein the outputs of the array receiving unit 300 are selected, and the outputs of the array receiving unit 300 are used as demodulation signals in a subsequent stage (not shown). The array receiving unit 300 receives and synthesizes the signals from a mobile station and outputs the synthesized signal, and also calculates the correction amounts of the amplitude fluctuations and phase shifts by using the detector circuit 307 and a separated calibration signal. The calculated correction amounts are supplied to the weight control circuit 308 and reflected in subsequent weighting.

Therefore, when the diversity reception quality is equivalent to that of the array reception quality, highly accurate calibration is possible without causing degraded speech quality and interrupted calls. On the other hand, if the diversity reception quality is inferior to the array reception quality, the calibration signal is superimposed to carry out calibration without interrupting calls by a mobile station, so that calibration can be effected by performing an operation based on a situation.

When calibration is forcibly carried out, the radio receiving apparatus according to the present invention may measure the amplitude fluctuations and the phase shifts of the array radio receiving units 306-1 through 306-N while switching them in order to calculate correction amounts. In this case, only a predetermined calibration signal switching unit selected from among the calibration signal switching units 305-1 through 305-N causes only a calibration signal to be supplied to the associated array radio receiving units, while the remaining calibration signal switching units cause only the reception outputs of the antenna to be supplied to the associated array radio receiving units. The demodulation signal switching unit 320 maintains the state wherein the outputs of the array receiving unit 300 are selected, and the outputs are used as demodulation signals in a subsequent stage (not shown). The weight control circuit 308 controls weighting so as to obtain an optimum output by using the outputs of the array radio receiving units except the array radio receiving unit to which the calibration signal is being supplied. The detector circuit 307 measures the amplitude fluctuations and phase shifts on the basis of the outputs of the array radio receiving unit to which the calibration signal has been supplied.

The array radio receiving units whose amplitude fluctuations and phase shifts are measured are sequentially switched. The detector circuit 307 measures the amplitude fluctuations and phase shifts of all array radio receiving units 306-1 through 306-N, then calculates the correction amounts for the individual array radio receiving units 306-1 through 306-N. The correction amounts are supplied to the weight control circuit 308 and reflected in the subsequent weighting.

Incidentally, in a case where the number of interfacial waves is smaller than a number of antennas N, a decrease of the number of antennas N will not cause much influence on the capability for restraining interference. Hence, the operation is effective in such a case.

If the reception quality of the diversity reception is equivalent to the reception quality of the array antenna reception, highly accurate calibration is possible without degraded speech quality and interrupted calls.

On the other hand, if the reception quality of the diversity reception is inferior to the reception quality of the array antenna reception, then the array radio receiving units are sequentially switched to carry out calibration, thus allowing the calibration to be effected by performing an operation best suited for a situation.

The radio receiving apparatus described above is configured to perform the weighting after the inverse spread. Alternatively, however, the apparatus may be configured to perform the weighting before the inverse spread.

Moreover, the present invention is not limited to the configurations and operations of the radio receiving apparatus described above. The present invention may also be applied to an apparatus that uses an MUSIC method or the like based on an arrival direction estimation algorithm for the array receiving unit 300.

As described above, the present invention has the following advantage.

If diversity reception makes it possible to secure the reception quality equivalent to that of array antenna reception, then diversity reception is performed in place of array antenna reception, and an array radio receiving unit is separated from an antenna to carry out calibration. As a result, highly accurate calibration can be automatically effected without interrupting communication, decreasing a communication capacity, and degrading communication quality, making it possible to always maintain good effect for restraining the interference of an adaptive array antenna.

If diversity reception quality is inferior to array reception quality, then a calibration signal is superimposed on each antenna reception output to carry out calibration without interrupting communication, permitting calibration to be effected by performing an operation based on a situation.

Alternatively, if the reception quality of diversity reception is inferior to the reception quality of array antenna reception, then array radio receiving units are switched in sequence to carry out calibration. This allows calibration to be effected by performing an operation best suited for a situation.

Industrial Applicabilty

The radio receiving apparatus according to the present invention is suited for a mobile communication using a CDMA system.

What is claimed is:

1. A radio receiving apparatus including an array antenna constituted by a plurality of antennas, a plurality of array radio receiving means provided in correspondence to the individual antennas, array signal processing means for weighting the outputs of the individual array radio receiving means in accordance with a predetermined algorithm, synthesizing the weighted outputs, and then outputting the synthesized output, and detecting means for calculating the correction amounts of an amplitude fluctuation and a phase shift of each array radio receiving means on the basis of the output of each array radio receiving means, the correction amounts being obtained by using a calibration signal which is a known signal, the radio receiving apparatus comprising:

calibration signal switching means each of which is connected between the individual antennas and the array radio receiving means associated with the individual antennas, receives a reception output of the individual antennas and the calibration signal, and selects either the reception output of the individual antennas or the calibration signal and outputs the selected one to the array radio receiving means;

diversity receiving means that receives the reception outputs of the plurality of antennas, carries out diversity processing, and outputs the results;

demodulation signal switching means that receives an output of the array signal processing means and an output of the diversity receiving means and provides either the output of the array signal processing means or the output of the diversity receiving means;

diversity reception quality monitoring means for monitoring the reception quality of diversity reception performed by the diversity receiving means;

array reception quality monitoring means for monitoring the reception quality of array antenna reception performed by the array radio receiving means and the array signal processing means; and receiving system deciding means that instructs the demodulation signal switching means to select the output of the diversity receiving means and instructs the calibration signal switching means to select the calibration signal if the reception quality of the diversity reception is equivalent to the reception quality of the array antenna reception.

2. The radio receiving apparatus according to claim 1, wherein the receiving system deciding means instructs the demodulation signal switching means to select the output of the array signal processing means and instructs the calibration signal switching means to select the reception output of the antenna after completion of the calculation of the correction amounts of the amplitude fluctuations and phase shifts of the individual array radio receiving means.

3. A radio receiving apparatus according to claim 1, wherein the receiving system deciding means instructs the demodulation signal switching means to select an output of the diversity receiving means, and instructs the calibration signal switching means to select the calibration signal if the reception quality of the diversity reception is equivalent to or higher than the reception quality of the array antenna reception, when the receiving system deciding means is instructed from outside to calculate correction amounts of amplitude fluctuations and phase shifts.

4. A radio receiving apparatus according to claim 1, wherein the calibration signal switching means is capable of outputting either the reception output of the individual antennas or the calibration signal, or a synthesized signal derived therefrom, and upon reception of an instruction for calculating the correction amounts of amplitude fluctuation and phase shift from outside, the receiving system deciding means instructs the demodulation signal switching means to select the output of the array signal processing means and instructs the calibration signal switching means to output the synthesized signal derived from the reception output of the antenna and the calibration signal if reception quality of the array antenna reception is better than the reception quality of the diversity reception.

5. A radio receiving apparatus according to claim 1, wherein upon reception of an instruction for calculating the correction amounts of amplitude fluctuation and phase shift from outside, the receiving system deciding means instructs the demodulation signal switching means to select the output of the array signal processing means, instructs a predetermined calibration signal switching means selected from among the plurality of calibration signal switching means to select the calibration signal, and instructs the remaining calibration signal switching means to select reception outputs of the antennas if the reception quality of the array antenna reception is better than the reception quality of the diversity reception, and also sequentially changes over the calibration signal switching means that selects the calibration signal.

6. A calibration method that is applied to a radio receiving apparatus that includes an array antenna constituted by a plurality of antennas and a plurality of array radio receiving means provided in correspondence to the individual antennas, and captures a reception result, as a demodulation signal, obtained by array antenna reception wherein outputs of the individual array radio receiving means are weighted and synthesized on the basis of a predetermined algorithm, and whereby to obtain the correction amounts of the amplitude fluctuations and phase shifts of the individual array radio receiving means by using a calibration signal which is a known signal, the calibration method comprising the steps of:

receiving the reception outputs of the individual antennas by the array radio receiving means individually associated therewith;

weighting and synthesizing the outputs of the individual array radio receiving means on the basis of the predetermined algorithm;

monitoring the reception quality of array antenna reception on the basis of the synthesized signal;

carrying out diversity reception processing by using the outputs of the plurality of antennas, and monitoring the reception quality of diversity reception;

effecting a changeover so that a result of the diversity reception is captured as the demodulation signal in place of a result of the array antenna reception if the reception quality of the diversity reception is equivalent to the reception quality of the array antenna reception;

inputting the calibration signal to the individual array radio receiving means; and obtaining the correction amounts of the amplitude fluctuations and phase shifts of the individual array radio receiving means on the basis of the outputs of the individual array radio receiving means.

7. A calibration method according to claim 6, comprising the steps of:
effecting a changeover to capture a result of the diversity reception in place of a result of the array antenna reception as the demodulation signal upon reception of an instruction for calculating the correction amounts of amplitude fluctuation and phase shift from outside, if the reception quality of diversity reception is equivalent to or higher than the reception quality of the array antenna reception;
supplying the calibration signal to the individual array radio receiving means; and
obtaining the correction amounts of the amplitude fluctuations and the phase shifts of the individual array radio receiving means on the basis of the outputs of the individual array radio receiving means.

8. A calibration method according to claim 6, comprising the steps of:
inputting the synthesized signal derived from the reception outputs of the individual antennas and the calibration signal to the array radio receiving means associated with the individual antennas if the reception quality of the array antenna reception is better than the reception quality of the diversity reception when an instruction for calculating the correction amounts of amplitude fluctuation and phase shift is received from outside; and
obtaining the correction amounts of the amplitude fluctuations and the phase shifts of the individual array radio receiving means on the basis of the outputs of the individual array radio receiving means.

9. The calibration method according to claim 6, comprising the steps of:
inputting the calibration signal only to a predetermined array radio receiving means selected from among the plurality of array radio receiving means if the reception quality of the array antenna reception is better than the reception quality of the diversity reception when an instruction for calculating the correction amounts of amplitude fluctuation and phase shift is received from outside;
inputting the reception outputs of the antennas to the remaining array radio receiving means;
sequentially switching the array radio receiving means to which the calibration signal is supplied; and
obtaining the correction amounts of the amplitude fluctuations and the phase shifts of the individual array radio receiving means on the basis of the outputs of the individual array radio receiving means.

10. A radio receiving apparatus according to claim 2, wherein the receiving system deciding means
instructs the demodulation signal switching means to select an output of the diversity receiving means, and instructs the calibration signal switching means to select the calibration signal if the reception quality of the diversity reception is equivalent to or higher than the reception quality of the array antenna reception, when the receiving system deciding means is instructed from outside to calculate correction amounts of amplitude fluctuations and phase shifts.

11. A radio receiving apparatus according to claim 10, wherein the calibration signal switching means is capable of outputting either the reception output of the individual antennas or the calibration signal, or a synthesized signal derived therefrom, and
upon reception of an instruction for calculating the correction amounts of amplitude fluctuation and phase shift from outside, the receiving system deciding means instructs the demodulation signal switching means to select the output of the array signal processing means and instructs the calibration signal switching means to output the synthesized signal derived from the reception output of the antenna and the calibration signal if reception quality of the array antenna reception is better than the reception quality of the diversity reception.

12. A radio receiving apparatus according to claim 10, wherein upon reception of an instruction for calculating the correction amounts of amplitude fluctuation and phase shift from outside, the receiving system deciding means instructs the demodulation signal switching means to select the output of the array signal processing means, instructs a predetermined calibration signal switching means selected from among the plurality of calibration signal switching means to select the calibration signal, and instructs the remaining calibration signal switching means to select reception outputs of the antennas if the reception quality of the array antenna reception is better than the reception quality of the diversity reception, and also sequentially changes over the calibration signal switching means that selects the calibration signal.

13. A radio receiving apparatus according to claim 2, wherein
the calibration signal switching means is capable of outputting either the reception output of the individual antennas or the calibration signal, or a synthesized signal derived therefrom, and
upon reception of an instruction for calculating the correction amounts of amplitude fluctuation and phase shift from outside, the receiving system deciding means instructs the demodulation signal switching means to select the output of the array signal processing means and instructs the calibration signal switching means to output the synthesized signal derived from the reception output of the antenna and the calibration signal if reception quality of the array antenna reception is better than the reception quality of the diversity reception.

14. A radio receiving apparatus according to claim 2, wherein
upon reception of an instruction for calculating the correction amounts of amplitude fluctuation and phase shift from outside, the receiving system deciding means instructs the demodulation signal switching means to select the output of the array signal processing means, instructs a predetermined calibration signal switching means selected from among the plurality of calibration signal switching means to select the calibration signal, and instructs the remaining calibration signal switching means to select reception outputs of the antennas if the reception quality of the array antenna reception is better than the reception quality of the diversity reception, and also sequentially changes over the calibration signal switching means that selects the calibration signal.

* * * * *